Patented July 17, 1934

1,966,604

UNITED STATES PATENT OFFICE 1,966,604

ZEIN COMPOSITIONS AND METHODS OF PREPARING SAME

James F. Walsh, Newton Center, and John V. MacDonough, Watertown, Mass., assignors, by mesne assignments, to American Maize Products Company, a corporation of Maine No Drawing. Application October 14, 1932, Serial No. 637,778

14 Claims. (Cl. 106—38)

This invention relates to new compositions made from zein, the alcohol soluble constituent of corn or maize. With the zein for the purpose of this invention, we combine a plasticizer and a suitable mutual solvent, as hereinafter described. The compositions, depending upon the amount of solvent used, will take the form of either a liquid coating composition, or more or less solid thermoplastic compositions, thereby serving the numerous and varied purposes and uses to which the compositions can be put.

Heretofore zein plastic compositions have been prepared by combining with the zein certain alkaline or acid glutenizing and plasticizing materials which on account of their alkaline or acid nature have seriously limited their field of usefulness due to the readiness with which such active chemicals attack other materials with which they come into contact.

Satow U. S. Patent No. 1,280,861, patented October 8, 1918 is typical of this prior art and discloses combining with vegetable proteids alkaline glutenizing agents, such as caustic soda or potash or alkaline carbonates, caustic lime and the like, alkaline salts such as borax, sodium phosphate and the like; or acidic glutenizing agents such as formic, acetic and similar organic acids; or lactic, tartaric, or other organic acids of the oxy-fatty series; or carbolic acid; or even inorganic acids such as phosphoric and sulphurous.

Other typical prior art includes Swett U. S. Patent No. 1,365,607, patented Jan. 11, 1921 and Goldsmith U. S. Patent No. 924,057, patented June 8, 1909. The plastic composition disclosed by the Swett patent is prepared from zein, aqueous alcohol, an alcoholic solution of resin, and an alcoholic solution of phenol. The Goldsmith composition is made from zein, alcohol and phenol or naphthol.

Insofar as the prior art has found it necessary to use alkaline and acid reacting substances to plasticize zein, the disadvantage of so doing has already been indicated. In addition, the other substances proposed in the prior art for plasticizing zein, such as phenols and like bodies, have the disadvantage that, besides being corrosive, they darken in the presence of light and heat and cause discoloration of the product. Moreover, the product possesses the disagreeable odor of the phenols.

As to the mutual solvents proposed by the prior art, these have been the relatively low boiling point alcohols including ethanol and the like, which have the disadvantage of drying out too quickly for the proper incorporation and plasticizing of the ingredients and furthermore, introduce a considerable fire risk due to their high volatility.

Avoiding these and the other defects of the zein plastics and other compositions as heretofore made, we have devised new zein compositions comprising zein, a suitable non-volatile plasticizer of neutral reaction such as an aromatic alkylated sulfonamid, and a suitable mutual solvent preferably a high boiling neutral solvent (usually suitably diluted with water or a low molecular weight alcohol) which presents neither an alkaline nor acid reaction, but on the contrary a substantially neutral reaction; and which does not darken nor possess a disagreeable odor and wherein the solvent dries slowly enough to produce and maintain thorough incorporation and plasticizing of the ingredients in the final product.

These and other objects and advantages of our improved zein compositions will appear from the following detailed descriptions of said compositions and their preparation, these being offered as illustrative examples of the invention, it being understood, however, that the invention is not to be limited to all the details theerof except as required by the appended claims.

We prefer to use a substantially pure zein prepared by any known or preferred process which will prepare the zein free from such detrimental ingredients as starches, fibre, oils and fatty acids. On the other hand, for some uses which call for a filler as part of the composition, the starch and fibre may be allowed to remain to constitute the filler in whole or in part or instead, some other suitable inert fibrous, powdery or other suitable form of material may be used for the filler.

Relatively pure zein may be obtained from gluten meal (from corn) by the successive steps of suitably extracting, precipitating, washing, drying etc. set forth in the co-pending application by Harry A. Buron, Ser. No. 637,777 "Zein and processes of making same", filed Oct. 14, 1932.

We then combine an aromatic alkylated sulfonamide with the zein in the presence of a neutral, organic, high boiling point mutual solvent. The aromatic alkylated sulfonamide will preferably be p-toluene ethyl sulfonamide $$(p\text{-}CH_3.C_6H_4.SO_2NH.C_2H_5);$$

or a mixture of ortho-and p-toluene ethyl sulfonamide; p-toluene methyl sulfonamide $$(p\text{-}CH_3.C_6H_4.SO_2NH.CH_3);$$

or benzene methyl sulfonamide $$(C_6H_5.SO_2.NH.CH_3)$$

and the like. These and equivalent plasticizing substances for the purposes of this invention are soluble in zein-solvents and are substantially non-volatile, neutral, odorless and colorless. The chosen plasticizer is added in an amount sufficient to impart the desired degree of plasticity to the final product or to the resulting coating in case the product is a liquid coating-composition. One part by weight of the sulfonamide plasticizer to two parts of zein will produce a particularly plastic product; whereas, for a less plastic sheet, one part of the plasticizer to three parts of zein may be used. Other proportions more or less may be used as required by the particular characteristics desired in the product. The amount of solvent and water present should be excluded when calculating the zein used.

For solvents I prefer to use one of the following:

"Carbitol" (b.pt. about 186° C.); "Cellosolve" (b.pt. about 124° C.); diacetone alcohol (b.pt. 166° C.); ethylene chlorhydrin (b.pt. 128° C.). All of these are mutual solvents for the zein and the aforesaid plasticizer; and all are characterized by being substantially colorless, relatively high boiling, neutral organic solvents.

Of course for certain uses, the high boiling solvents may be dispensed with, especially where the properties and advantages introduced by the high boiling solvents have no particular merit in the particular instance; and in their place a low boiling mutual solvent may be used, such as aqueous ethanol, isopropanol or tertiary butanol containing about 20% by volume of water.

A further description of the aforesaid high boiling solvents which I prefer to use, is as follows: "Carbitol" is a trade-name for the ethers of di-ethylene glycol and "Cellosolve" is the trade-name for the ethers of ethylene glycol. The lowest boiling member of the class is methyl Cellosolve having a boiling point of 124.5° C. Others of the class range upward to well over 200° C. Specific examples of these solvents include compounds such as ethylene glycol mono methyl ether; ethylene glycol mono ethyl ether, ethylene glycol mono butyl ether, di-ethylene glycol (mono-ethyl) ether and di-ethylene glycol (mono butyl) ether. It is necessary to effect solution of zein that the solvents of this class be mixed with water; used alone they do not dissolve zein. The proportion of water in the solvent mixture may vary widely but results are most satisfactory when the water ingredient constitutes about 15 to 40% by volume of the solvent mixture. However, solvent mixtures containing either more or less water than the above, are usable though they act less rapidly and effectively to dissolve zein. Solutions usable for practical operations will contain more than 5% and less than about 60% by volume of water.

If desired, other solvents such as ethanol or other low molecular weight alcohols such as butanols (normal, iso or tertiary) propanols, etc. and alcohol derivatives such as di-acetone alcohol, which with water are zein solvents, may be used with the glycol alkyl ether-water mixture. The amount of water present in such ternary mixtures should bear substantially the same ratio to the total volume of the mixture as it does when it is used with the "Cellosolve" or "Carbitol" solvent alone. For example, a suitable solvent would comprise 65-85% by volume of the glycol mono alkyl ether-alcohol mixture, the balance being water.

The foregoing aqueous "Cellosolve" and "Carbitol" solvents are equally solvents for the aromatic alkylated sulfonamide plasticizer. While ordinarily the same solvent mixture would be used throughout to dissolve both the zein and the plasticizer for effecting their thorough incorporation, it is also practical to use more than one solvent, if desired, where the plural solvents are compatible with each other and with the zein and the plasticizer and any other ingredients present. Thus the plasticizer may be dissolved or mixed with one solvent and the zein with another. Also an alcohol of the low boiling type referred to above may be used with or without water as one of the solvents.

The aqueous "Cellosolve" and aqueous "Carbitol" solvents may be used cold. However when used fairly hot, they are much more effective in dissolving zein and the aforesaid sulfonamide plasticizer.

Pure or substantially pure zein and the sulfonamide plasticizer dissolve in aqueous "Carbitol" or "Cellosolve" to give a neutral, transparent, light amber or substantial-colorless solution. The high boiling properties of these solvents allow the solution to remain fluid for a considerable period of time. With further simple precautions against solvent evaporation, the solution will keep almost indefinitely without decomposition or deterioration. With sufficient solvent, the solution may be given any reasonably desired condition of fluidity.

In the appended claims when we refer to an ethylene glycol (mono alkyl) ether we refer both to the ethylene glycol and di-ethylene glycol ethers, the two being equivalents for the purpose of this invention.

Another particularly satisfactory high boiling solvent (mentioned supra) for zein and the sulfonamide plasticizer is di-acetone alcohol mixed with water in varying proportions as described hereinafter. This solvent is stable and medium high boiling and is neither acidic nor alkaline reacting. Hence it possesses the advantages of a neutral, not-too-rapidly evaporating solvent. The addition of water is necessary, as di-acetone alcohol alone is not effective. The proportions of di-acetone alcohol to water may vary considerably; and a mixture effective as a solvent for the purposes of our invention comprises 60% to 80% by volume of di-acetone alcohol to 40% to 20% of water. As before, a low molecular weight alcohol may also be added to make a combination solvent. Di-acetone alcohol boils at 164° C.

Another solvent (referred to supra) usable for the purposes of this invention is ethylene chlorhydrin, boiling at 128° C. This solvent belongs to the class which we term "olefine halo-hydrins" which includes other compounds usable for the purposes of the invention such as propylene chlorhydrin and propylene brom-hydrin. This solvent is much more effective when it is used hot. It is possible to use the olefine halo-hydrins either alone or with other compounds to form a mixed solvent. Such other compounds include ethanol, iso propanol, normal or tertiary butanols and other like alcohols of low molecular weight; water is also suitable, and if desired, more than one of these other compounds may be used with the olefine halo-hydrin to make a solvent mixture. For best results the olefine halo-hydrin should form at least 30% to 40% by volume of the total solvent, although somewhat less is usable if desired. A suitable solvent according to this invention would be for example, 40% to 100% by volume of ethylene chlorhydrin, the balance if any, being water or one of the alcohols mentioned above.

All of the above solvents "Carbitols", "Cellosolves", di-acetone alcohols, olefine halo-hydrins, are neutral in reaction and hence non-injurious and usable in many places where an alkaline or acid reaction would be harmful; also being relatively high boiling, all serve to retard the drying of the zein-plasticizer-solvent mixture. Because of this latter characteristic they aid in plasticizing the zein as well as in dissolving it. Furthermore, all of the solvents are colorless; and are freely miscible with water as well as with a wide range of other compounds which may be used as plasticizers or as auxiliary solvents or for other desired purposes.

In carrying out our process, we compound the ingredients as follows. Thus we may incorporate the sulfonamide plasticizer with the zein-and-solvent mixture, or the plasticizer may be dissolved in all or part of the solvent, and then the zein either alone or with the rest of the solvent, may be mixed therewith. Also any dye, filler, resin or other desirable ingredient for the particular use may be added. The whole is then thoroughly mixed and incorporated together, preferably hot. Depending upon the amount of solvent used, the resulting product will be either a liquid coating composition or will be a viscous mass, the latter adapted then to be formed and dried in any suitable manner. Methods of forming and drying are well known in the plastic composition art and the following brief description will therefore suffice. Thus, for forming masses such as tubes, rods or relatively thick sheets, the zein-plasticizer-solvent mixture should be preferably heavy and viscous and may be made so, by using a sufficiently small amount of solvent. This mixture is filtered and then rolled, sheeted, or expanded to proper form in well known ways. For forming films or threads, more solvent is used than in making the above-described thicker masses in order that a sufficiently fluid material may be obtained. Care should also be taken to use sufficient plasticizer so that the resulting product will have the flexibility ordinarily desired for films and threads. The mixture, thus in the form of a flowable solution, is cast on wheels or belts in the customary way for making films; or is spun into threads by the usual dry-spinning processes.

The aforesaid products of this invention whether liquid coating compositions or solid compositions are substantially transparent and colorless, unless purposely colored, or are only slightly amber-colored; and may be made to have any reasonable degree of flexibility. The purer the zein and the other ingredients, the nearer will the products possess complete transparency and colorlessness. Of course, they may be dyed to any desired color.

If desired, the described product (in the form of a thick mass or any other desired form) may be ground or pulverized by passing it through a resin-mill or other suitable apparatus, and used as a thermo-plastic molding powder. Such a powder with or without a filler, pigment or other ingredients added at any desired stage of the process, is convertible into molded products by heat and pressure in well known ways.

Where sufficient solvent is employed to make a freely flowable, liquid coating-composition, the zein, the solvent and the plasticizer are mixed together in any desired order with or without the addition of colors or dyes or other suitable or desired resins, pigments and fillers. The zein should be substantially pure, preferably 97% to 100% pure. The plasticizer will be an aromatic alkylated sulfonamide, and the solvent will be one of the aforesaid high boiling point solvents or some other solvent or combination of solvents having this characteristic and the other desirable properties of such solvents as herein set forth.

The resulting liquid coating composition will be useful for coating or finishing fabrics, paper, leather, wood, etc. to give a firmly adhering, glossy, permanent, flexible surface-coating. The composition may be applied by spraying, painting, dipping or in any other suitable manner; and after drying gives a glossy finish which is non-tacky and possesses a considerable degree of flexibility. The coating contains no acids or alkalis and hence is an improvement over coating materials which because of acidity or alkalinity are apt to injure the surfaces to which they are applied. The coating of this invention is also free from the serious objection raised against coatings containing highly inflammable solvents such as ethanol, for while aqueous ethanol could be used as a solvent for the zein and plasticizer, it is preferable for most coating preparations to use solvents which have a much higher boiling point and are therefore distinctly less inflammable. Furthermore, the coating is substantially odorless and does not decompose even after a long period of time. Although flexible, it imparts considerable stiffness to such materials as cloth or like fabrics, or paper, or similar flexible articles.

The proportions of the aforesaid ingredients in the liquid coating-composition will vary according to the viscosity desired for the composition and the flexibility required in the final product. By way of example, for giving a final surface of medium flexibility, the composition would comprise about 100 parts of substantially pure zein with 40 parts para-toluene ethyl sulfonamide (both by weight) mixed with enough solvent to give a freely flowing solution, for example, 10% zein in the total solvent. A good solvent in this instance would be any of the high boiling point solvents already mentioned. Coloring agents and fillers are added as desired, and the whole is thoroughly mixed, preferably while hot or warm as the solvent is then much more effective.

What we claim is:

1. A composition comprising zein and an aromatic alkylated sulfonamide incorporated together.

2. A substantially transparent, neutral, odorless thermo-plastic composition comprising zein and an aromatic alkylated sulfonamide incorporated together.

3. A liquid coating-composition comprising zein and an aromatic alkylated sulfonamide incorporated together with a neutral, organic, mutual solvent having a relatively high boiling point as compared with the low molecular weight alcohols.

4. A liquid coating-composition comprising zein and a substantially non-volatile, neutral, organic plasticizer incorporated together with a neutral, organic, mutual solvent having a boiling point higher than 120° C.

5. A liquid coating composition comprising, incorporated together, zein of a purity of 97% or greater; an aromatic alkylated sulfonamide plasticizer; and a mutual solvent.

6. Method of preparing plastic compositions which comprises incorporating zein with an aromatic alkylated sulfonamide plasticizer in the presence of a neutral organic, mutual solvent having a boiling point higher than 120° C.

7. Method of preparing plastic compositions which comprises incorporating zein with an aromatic alkylated sulfonamide plasticizer in the presence of a mutual solvent comprising aqueous ethylene glycol ether.

8. Method of preparing plastic compositions which comprises incorporating zein with an aromatic alkylated sulfonamide plasticizer in the presence of a mutual solvent comprising aqueous di-acetone alcohol.

9. Method of preparing plastic compositions which comprises incorporating zein with an aromatic alkylated sulfonamide plasticizer in the presence of a mutual solvent comprising an olefine halo-hydrine.

10. Method of preparing plastic compositions which comprises incorporating zein with a substantially non-volatile, neutral, odorless organic plasticizer in the presence of a neutral, substantially colorless, organic, mutual solvent having a boiling point higher than 120° C.

11. Method of preparing plastic compositions which comprises incorporating zein with a substantially non-volatile, neutral, odorless organic plasticizer in the presence of a mutual solvent comprising aqueous ethylene glycol ether.

12. Method of preparing plastic compositions which comprises incorporating zein with a substantially non-volatile, neutral, odorless organic plasticizer in the presence of a mutual solvent comprising aqueous di-acetone alcohol.

13. Method of preparing plastic compositions which comprises incorporating zein with a substantially non-volatile, neutral, odorless organic plasticizer in the presence of a mutual solvent comprising an olefine halo-hydrine.

14. A plastic composition comprising, incorporated together, zein; an aromatic alkylated sulfonamide plasticizer; and a mutual organic solvent having a boiling point higher than 120° C.

JAMES F. WALSH.
J. V. MacDONOUGH.

DISCLAIMER 1,966,604.—*James F. Walsh*, Newton Center, and *John V. MacDonough*, Watertown, Mass. ZEIN COMPOSITIONS AND METHODS OF PREPARING SAME. Patent dated July 17, 1934. Disclaimer filed July 18, 1935, by the assignee, *American Maize-Products Company*.

Hereby enters its disclaimer to said patent as follows:

It disclaims any meaning of the words "plasticizer" or "plasticizing substances" broad enough to include non-solvent plasticizers, and specifically it disclaims from the scope of claim 4 any liquid coating composition except one in which the substantially non-volatile neutral, organic plasticizer employed is a solvent for zein; and disclaims from the scope of claims 10, 11, and 12 any method of preparing plastic compositions except one in which the substantially non-volatile, neutral, odorless organic plasticizer incorporated with the zein is a solvent for zein.

[*Official Gazette August 6, 1935.*]

which comprises incorporating zein with an aromatic alkylated sulfonamide plasticizer in the presence of a mutual solvent comprising aqueous di-acetone alcohol.

9. Method of preparing plastic compositions which comprises incorporating zein with an aromatic alkylated sulfonamide plasticizer in the presence of a mutual solvent comprising an olefine halo-hydrine.

10. Method of preparing plastic compositions which comprises incorporating zein with a substantially non-volatile, neutral, odorless organic plasticizer in the presence of a neutral, substantially colorless, organic, mutual solvent having a boiling point higher than 120° C.

11. Method of preparing plastic compositions which comprises incorporating zein with a substantially non-volatile, neutral, odorless organic plasticizer in the presence of a mutual solvent comprising aqueous ethylene glycol ether.

12. Method of preparing plastic compositions which comprises incorporating zein with a substantially non-volatile, neutral, odorless organic plasticizer in the presence of a mutual solvent comprising aqueous di-acetone alcohol.

13. Method of preparing plastic compositions which comprises incorporating zein with a substantially non-volatile, neutral, odorless organic plasticizer in the presence of a mutual solvent comprising an olefine halo-hydrine.

14. A plastic composition comprising, incorporated together, zein; an aromatic alkylated sulfonamide plasticizer; and a mutual organic solvent having a boiling point higher than 120° C.

JAMES F. WALSH.
J. V. MacDONOUGH.

DISCLAIMER 1,966,604.—*James F. Walsh*, Newton Center, and *John V. MacDonough*, Watertown, Mass. Zein Compositions and Methods of Preparing Same. Patent dated July 17, 1934. Disclaimer filed July 18, 1935, by the assignee, *American Maize-Products Company*.

Hereby enters its disclaimer to said patent as follows:

It disclaims any meaning of the words "plasticizer" or "plasticizing substances" broad enough to include non-solvent plasticizers, and specifically it disclaims from the scope of claim 4 any liquid coating composition except one in which the substantially non-volatile neutral, organic plasticizer employed is a solvent for zein; and disclaims from the scope of claims 10, 11, and 12 any method of preparing plastic compositions except one in which the substantially non-volatile, neutral, odorless organic plasticizer incorporated with the zein is a solvent for zein.

[*Official Gazette August 6, 1935.*]